(12) United States Patent
Lin et al.

(10) Patent No.: US 9,104,279 B2
(45) Date of Patent: Aug. 11, 2015

(54) SCAN METHOD FOR INCREASING FRAME RATE OF TOUCH PANEL AND TOUCH PANEL DEVICE USING THE SAME

(71) Applicant: ELAN MICROELECTRONICS CORPORATION, Hsin Chu (TW)

(72) Inventors: Chia-Hsing Lin, Hsinchu (TW); Yi-Hsin Tao, Hsinchu (TW)

(73) Assignee: ELAN MICROELECTRONICS CORPORATION, Hsin Chu (TW)

( * ) Notice: Subject to any disclaimer, the term of this patent is extended or adjusted under 35 U.S.C. 154(b) by 144 days.

(21) Appl. No.: 13/746,192

(22) Filed: Jan. 21, 2013

(65) Prior Publication Data

US 2013/0241870 A1    Sep. 19, 2013

(30) Foreign Application Priority Data

Mar. 15, 2012    (TW) .............................. 101108825 A

(51) Int. Cl.
G06F 3/041    (2006.01)
G06F 3/044    (2006.01)

(52) U.S. Cl.
CPC .............. *G06F 3/044* (2013.01); *G06F 3/0416* (2013.01)

(58) Field of Classification Search
CPC ................................ G06F 3/0416; G06F 3/044
USPC .......................................................... 345/173
See application file for complete search history.

(56) References Cited

U.S. PATENT DOCUMENTS

| 2004/0003949 A1* | 1/2004 | Lin .............................. 178/18.01 |
| 2011/0095991 A1* | 4/2011 | Philipp et al. .................. 345/173 |
| 2011/0175833 A1* | 7/2011 | Kurokawa et al. ............. 345/173 |
| 2013/0038570 A1* | 2/2013 | Seo et al. ....................... 345/174 |

FOREIGN PATENT DOCUMENTS

| CN | 102193698 A | 9/2011 |
| CN | 102375607 A | 3/2012 |
| JP | 2009-294903 A | 12/2009 |
| TW | 201005600 A | 2/2010 |
| TW | 201102898 A | 1/2011 |

* cited by examiner

*Primary Examiner* — Long D Pham
(74) *Attorney, Agent, or Firm* — patenttm.us

(57) ABSTRACT

A scan method for increasing frame rate of a touch panel having multiple driving lines, multiple sensing lines and a scan cycle with multiple detection cycles, has steps of generating multiple sets of asynchronous excitation signals within each detection cycle with each set of excitation signals outputted to a corresponding driving line, and receiving capacitance sensing values from the sensing lines corresponding to the driving lines. In contrast to conventional scan methods only outputting one set of excitation signals within each detection cycle, the time required to scan entire driving lines is greatly reduced and the frame rate is increased. Additionally, as the multiple sets of asynchronous excitation signals are asynchronous, the interference to the capacitance sensing values sensed by the sensing circuit in response to the multiple sets of excitation signals won't occur.

32 Claims, 11 Drawing Sheets

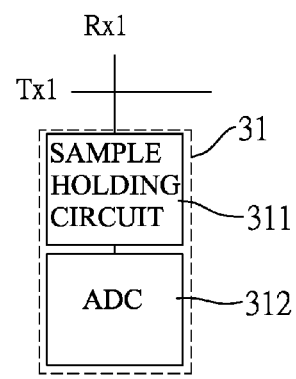
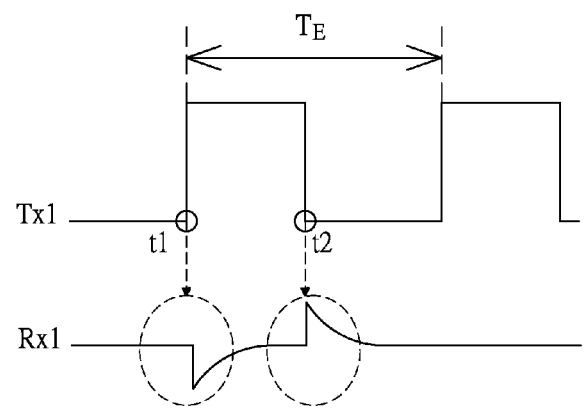
FIG. 4B         FIG. 4A
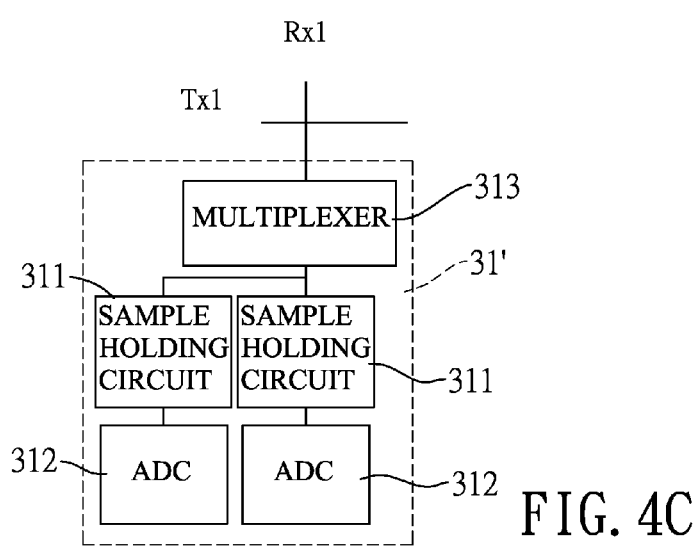
FIG. 4C

SCAN METHOD FOR INCREASING FRAME RATE OF TOUCH PANEL AND TOUCH PANEL DEVICE USING THE SAME

BACKGROUND OF THE INVENTION

1. Field of the Invention

The present invention relates to a touch panel and more particularly to a scan method for increasing frame rate of touch panel and touch panel device using the same.

2. Description of the Related Art

With reference to FIG. 8A, a touch panel 60 has multiple driving lines Tx1~Tx4 and multiple sensing lines Rx1~Rx4. The driving lines Tx1~Tx4 are connected to a driving circuit 70. The sensing lines Rx1~Rx4 are connected to a sensing circuit 80.

With reference to FIG. 5B, the driving circuit 70 drives the driving lines Tx1~Tx4 within a scan time. The scan time $T_{SCAN}$ has multiple detection cycles $T_D$, and an excitation signal is outputted to a driving line within each detection cycle $T_D$. When each driving line Tx1~Tx4 receives an excitation signal outputted from the driving circuit 70, the sensing circuit 80 connected to the sensing lines Rx1~Rx4 starts receiving sensing signals. With reference to FIG. 8C, each sensing line Rx1~Rx4 generates a voltage or current variation upon a rising edge t and a falling edge t2 of each cycle of any excitation signal. Hence, given the sensing line Rx2 as an example, the receiving circuit 80 can perform signal sampling at the rising edge t1 or the falling edge t2 to acquire a sensed capacitance value $-C_{22}$ on the sensing line Rx2.

From the foregoing description, if no touch object is available on the touch panel 60, the capacitance value $-C_{22}$ can be sensed at sensing points intersected by the driving lines Tx1~Tx4 and the sensing lines Rx1~Rx4 as a result of the excitation signal. With reference to FIG. 9, suppose that a touch object appears on a sensing point intersected by the driving line Tx2 and the sensing line Rx2. As the touch object is a good conductor of electricity, it will absorb a part of energy stored at the sensing point indicated by Tx2 and Rx2 arising from the excitation signal. Hence, the capacitance value sensed by the sensing circuit 80 is $-C_{22}+\Delta C_{22}$, which is a capacitance variation normally used to identify if a touch object is present.

With reference to FIG. 10, to enhance the signal-to-noise ratio (SNR), the driving circuit sequentially outputs K excitation signals within each detection cycle $T_D$ with each excitation signal having an excitation cycle $T_E$, so that $T_D$ K*$T_E$. Hence, after the completion of each detection cycle $T_D$, each sensing circuit can sample K capacitance values, and the K capacitance values are summed up to enhance the SNR.

However, such detection method is disadvantageous to a frame rate of large-scale touch panel. Given $T_E \geq 10RC$ as an example, each driving line needs to take an amount of time K×10RC to finish scan, and the driving circuit sequentially outputs K excitation signals to the driving lines with only one of the driving lines being driven within the detection cycle. As a large-scale touch panel has more driving lines than a relatively smaller touch panel, if the large-scale touch panel has N driving lines, finishing the scan of all driving lines should take at least an amount of time N×K×10RC. Accordingly, the frame rate of the large-scale touch panel is inevitably extended and a delay in operation is caused.

SUMMARY OF THE INVENTION

An objective of the present invention is to provide a scan method for increasing frame rate of a touch panel and a touch panel device using the same.

To achieve the foregoing objective, the touch panel has multiple driving lines, multiple sensing lines and a scan cycle with multiple detection cycles, and the method has steps of:

generating multiple sets of asynchronous excitation signals within each detection cycle with each set of excitation signals outputted to a corresponding driving line; and receiving capacitance sensing values from the sensing lines corresponding to the driving lines.

To achieve the foregoing objective, the touch panel device has a touch panel, a driving circuit and a sensing circuit.

The touch panel has multiple driving lines and multiple sensing lines.

The driving circuit is connected to the driving lines of the touch panel, has a scan cycle with multiple detection cycles, generates multiple sets of asynchronous excitation signals, and outputs each set of excitation signals to corresponding driving lines.

The sensing circuit has multiple sensing units respectively connected to the sensing lines to sense a capacitance sensing value of each sensing line.

The present invention outputs multiple sets of asynchronous excitation signals within each detection cycle of a scan cycle and partially overlaps the multiple sets of excitation signals in time. In contrast to conventional scan methods only outputting one set of excitation signals within each detection cycle, the time required to scan entire driving lines is greatly reduced. Additionally, as the multiple sets of asynchronous excitation signals are asynchronous, the interference to the capacitance sensing values sensed by the sensing circuit in response to the multiple sets of excitation signals won't occur. Accordingly, the present invention indeed effectively shortens the scan time and enhances the frame rate.

Other objectives, advantages and novel features of the invention will become more apparent from the following detailed description when taken in conjunction with the accompanying drawings.

BRIEF DESCRIPTION OF THE DRAWINGS

FIG. 4A is a functional block diagram of a first embodiment of a sensing unit of the touch panel in FIG. 1;

FIG. 4B is a waveform diagram of signals of a driving line and a sensing line of the touch panel in FIG. 1;

FIG. 4C is a functional block diagram of a second embodiment of a sensing unit of the touch panel in FIG. 1;

DETAILED DESCRIPTION OF THE INVENTION

Figure 1:
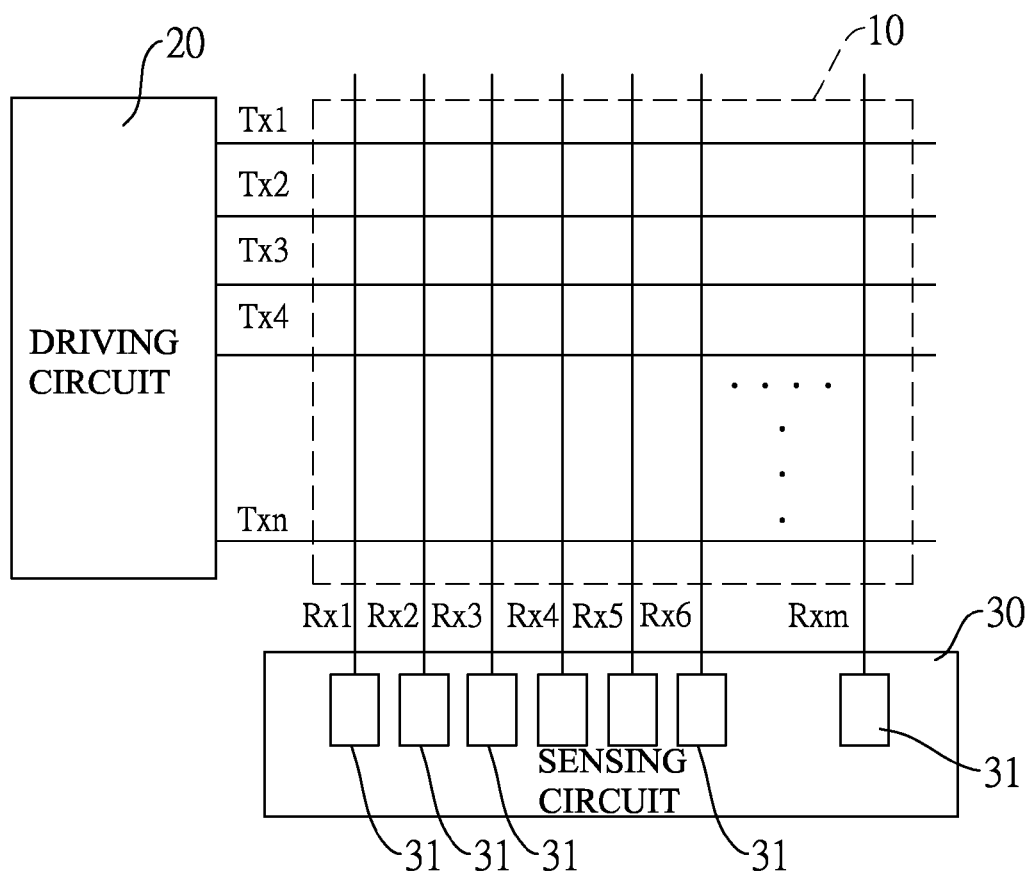
FIG. 1 is a wiring layout diagram of a touch panel device in accordance with the present invention.

With reference to FIGS. 1 and 2, a touch panel 10 has multiple driving lines Tx1~Txn and multiple sensing lines Rx1~Rxm, and a scan method for increasing frame rate of touch panel in accordance with the present invention has a scan cycle $T_{SCAN}$ with multiple detection cycles $T_D$ and has the following steps.

Generate multiple sets of asynchronous excitation signals within each detection cycle $T_D$ with each set of excitation signals outputted to a corresponding driving line Tx1~Txn.

Receive capacitance sensing values from the sensing lines Rx1~Rxm corresponding to the driving lines Tx1~Txn.

Figure 2A:
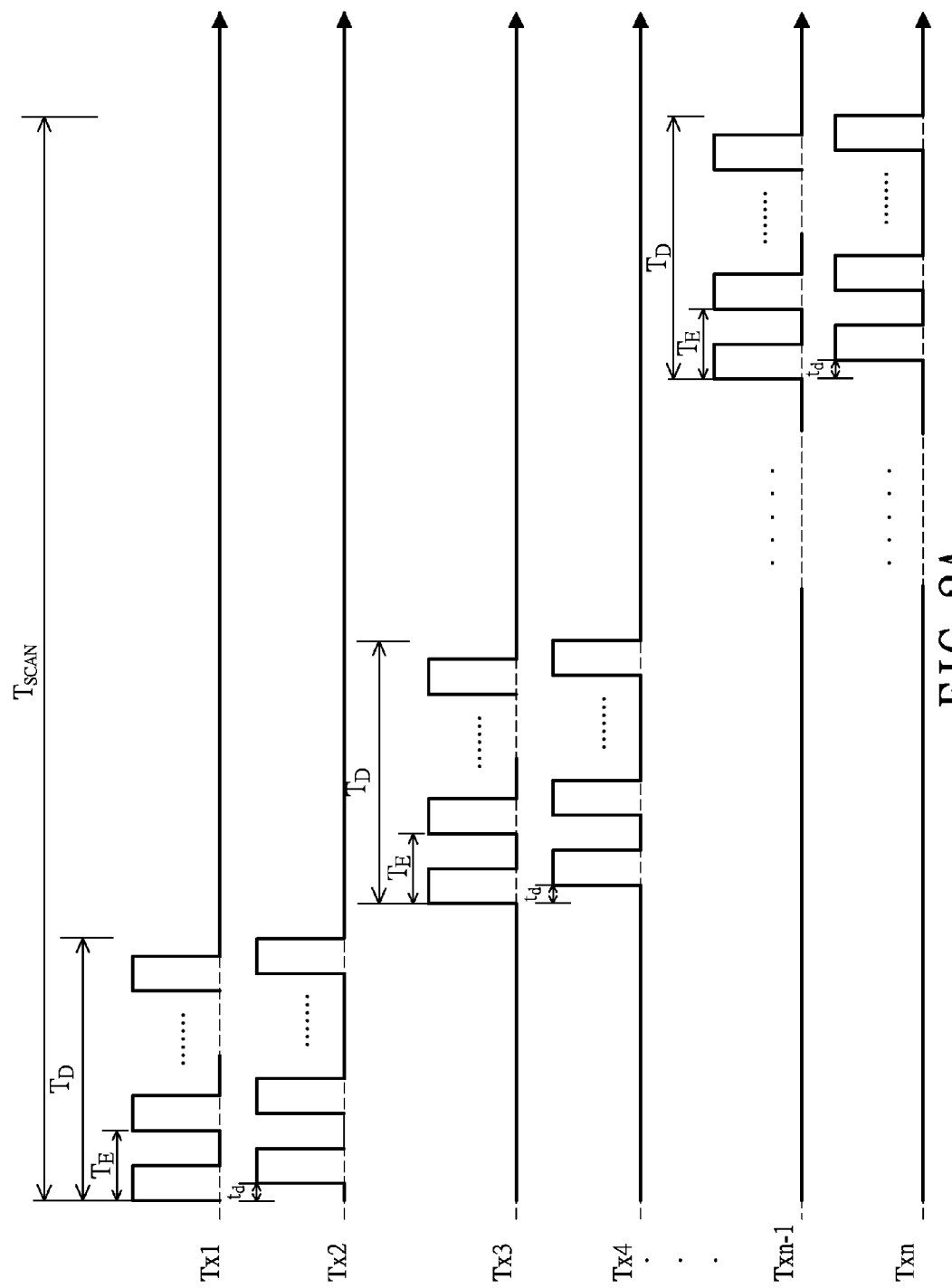
FIG. 2A is a first time sequence diagram of four sets of excitation signals in accordance with the present invention.
Figure 2B:
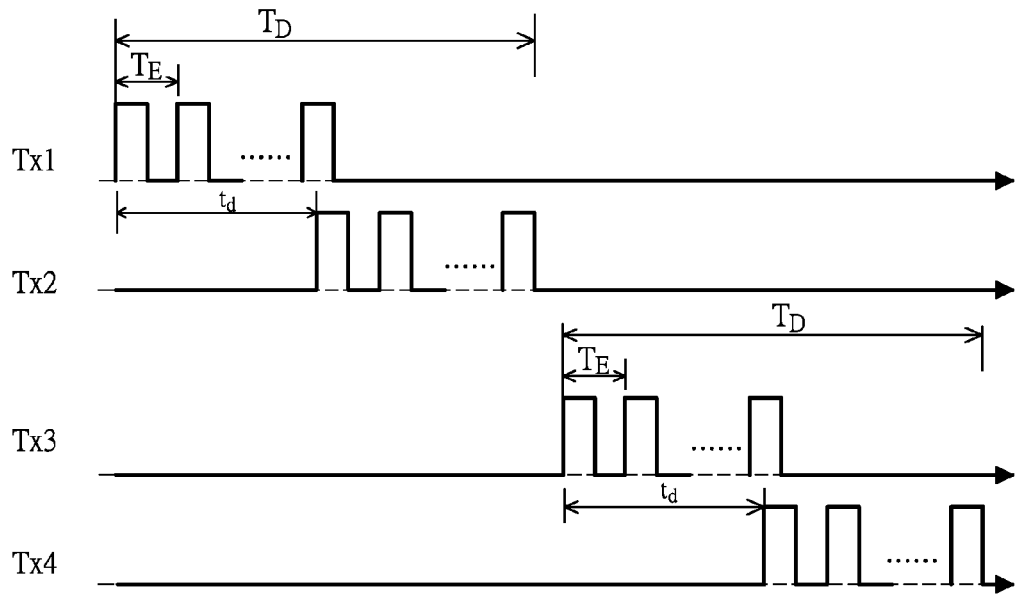
FIG. 2B is a second time sequence diagram of four sets of excitation signals in accordance with the present invention.
Figure 2C:
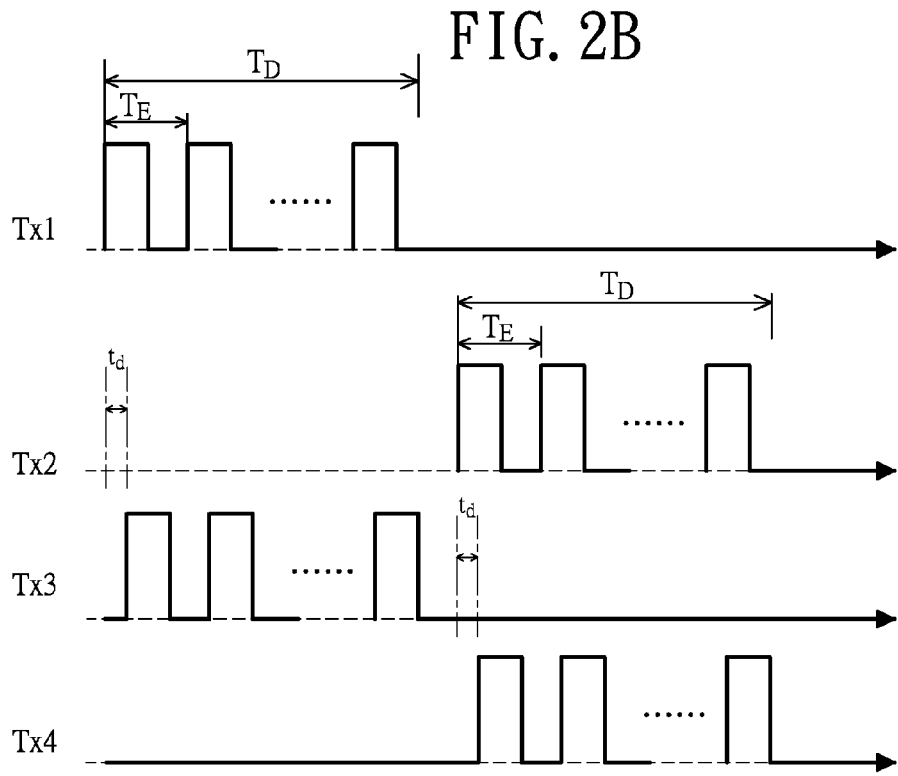
FIG. 2C is a third time sequence diagram of four sets of excitation signals in accordance with the present invention.

With reference to FIG. 2A, in the present embodiment, two sets of asynchronous excitation signals are outputted within each detection cycle $T_D$ of the scan cycle $T_{SCAN}$. A time difference $t_d$ is maintained between the two sets of asynchronous excitation signals, and the time difference is not less than a sample holding time. With reference to FIG. 2B, the time difference $t_d$ is not greater than the detection time $T_D$. With reference to FIGS. 2A and 2B, the two sets of asynchronous excitation signals can be sequentially outputted to every other adjacent two of the driving lines Tx1/Tx2, Tx3/Tx4. With reference to FIG. 2C, the two sets of asynchronous excitation signals can be sequentially outputted to every adjacent two of the driving lines spaced apart by one driving line or x driving lines.

From the embodiments of FIGS. 2A to 2C, when two sets of excitation signals are outputted within each detection cycle TD, the time required to scan N driving lines is shortened from original N×K×10RC to about $$\frac{N}{2} \times K \times 10\, RC.$$

Figure 3:
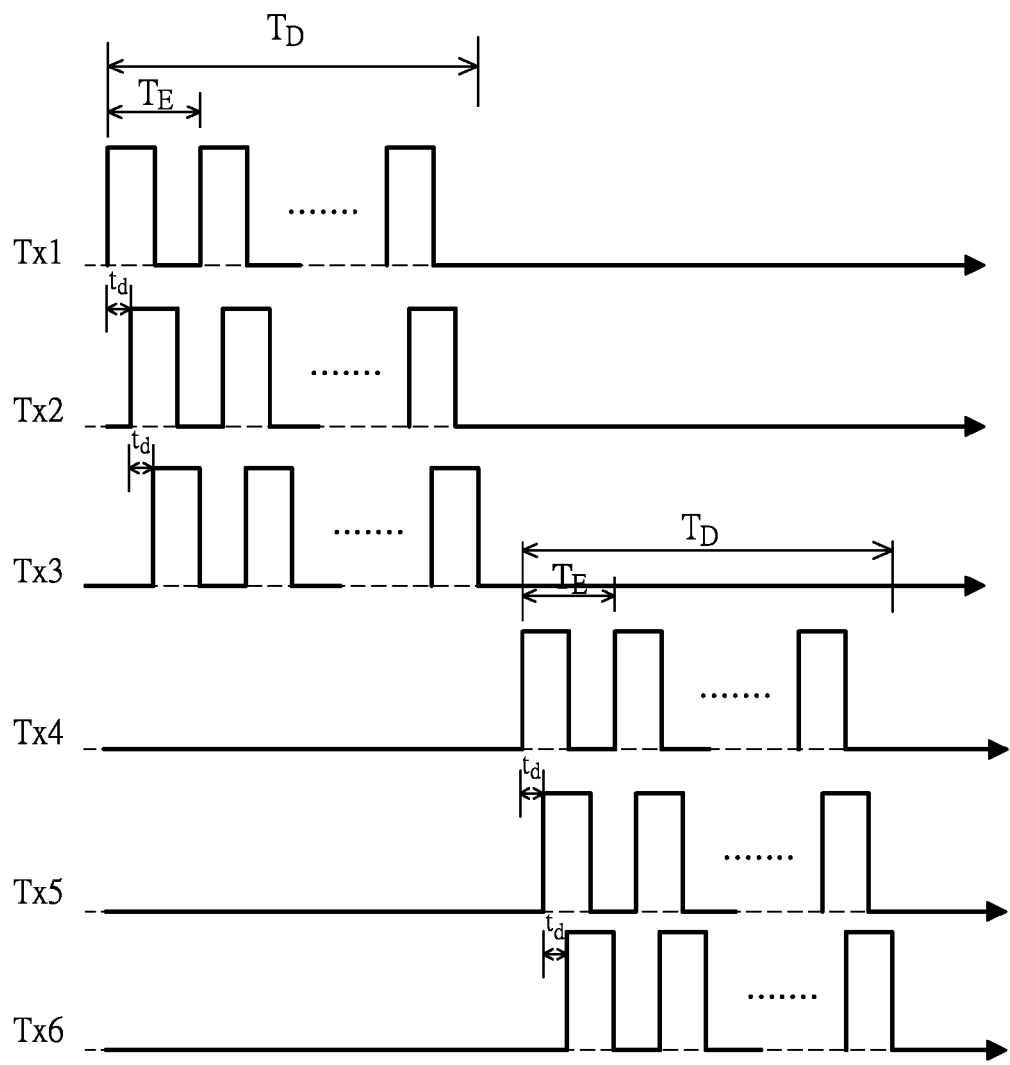
FIG. 3 is a time sequence diagram of six sets of excitation signals in accordance with the present invention.

Suppose that the 10RC is a signal delay time of a single driving line. With reference to FIG. 3, three sets of asynchronous excitation signals are outputted within each detection cycle $T_D$, and the time required to scan N driving lines is further shortened to about $$\frac{N}{3} \times K \times 10\, RC.$$

Hence, if J sets of asynchronous excitation signals are outputted within each detection cycle $T_D$, the time required to scan N driving lines is further shortened to about $$\frac{N}{J} \times K \times 10\, RC.$$

In other words, the time for generating a single frame is $$\frac{N}{J} \times K \times 10\, RC,$$

thereby significantly improving the frame generation rate.

With further reference to FIG. 1, a touch panel in accordance with the present invention has a touch panel 10, a driving circuit 20 and a sensing circuit 30.

The touch panel 10 has multiple driving lines Tx1~Txn and multiple sensing lines Rx1~Rxm.

The driving circuit 20 is connected to the driving lines Tx1~Txn of the touch panel 10, has a scan cycle $T_{SCAN}$ with multiple detection cycles $T_D$, generates multiple sets of asynchronous excitation signals, and outputs each set of excitation signals to corresponding driving lines Tx1~Txn. All embodiments of outputting multiple sets of asynchronous excitation signals from the driving circuit 20 within each detection cycle TD are the same as those in FIGS. 2A to 2C and 3, and are therefore not repeated here.

The sensing circuit 30 has multiple sensing units 31. With reference to FIG. 4A, the sensing unit 31 at least has a sample holding circuit 311 and an analog-to-digital converter (ADC) 312. The sample holding circuit 311 is connected to a corresponding sensing line Rx1~Rxm to sense a coupling capacitance of the sensing line Rx1~Rxm. The ADC 312 is connected to the sample holding circuit 311 to acquire a sampled capacitance sensing value. The sample holding circuit 311 must sample at least one time at the rising edge t1 or the falling edge t2 within an excitation cycle $T_E$ of each excitation signal. With reference to FIG. 4B, the time required by the sample holding circuit 311 is a sample holding time. To prevent two sets of asynchronous excitation signals from causing interference to identical sensing line, a time difference $t_d$ between the two sets of asynchronous excitation signals outputted from the driving circuit 20 within each detection cycle $T_D$ should not be less than the sample holding time.

Preferably, the sample holding circuit 311 of the sensing unit 31 performs signal sampling at the rising edge t1 or the falling edge t2, and the ADC 312 may be a non-pipeline ADC. Besides, if the sensing unit 31 intends to intensify the SNR, the ADC 312 may be a pipeline ADC, and the sample holding circuit 311 performs signal sampling at both rising edge t1 and the falling edge t2 to intensify the sampled signal and further increase the SNR. With reference to FIG. 4C, another embodiment of the sensing unit 31' has two sets of parallel sample holding circuits and non-pipeline ADCs and a multiplexer 313. The multiplexer 313 is connected to a corresponding sensing line Rx1~Rxm and is switchable for the two non-pipeline ADCs 312 to convert the capacitance sensing values sampled at the rising edge t1 and the falling edge t2 of the excitation signal through the corresponding sample holding circuits 311.

Figure 5:
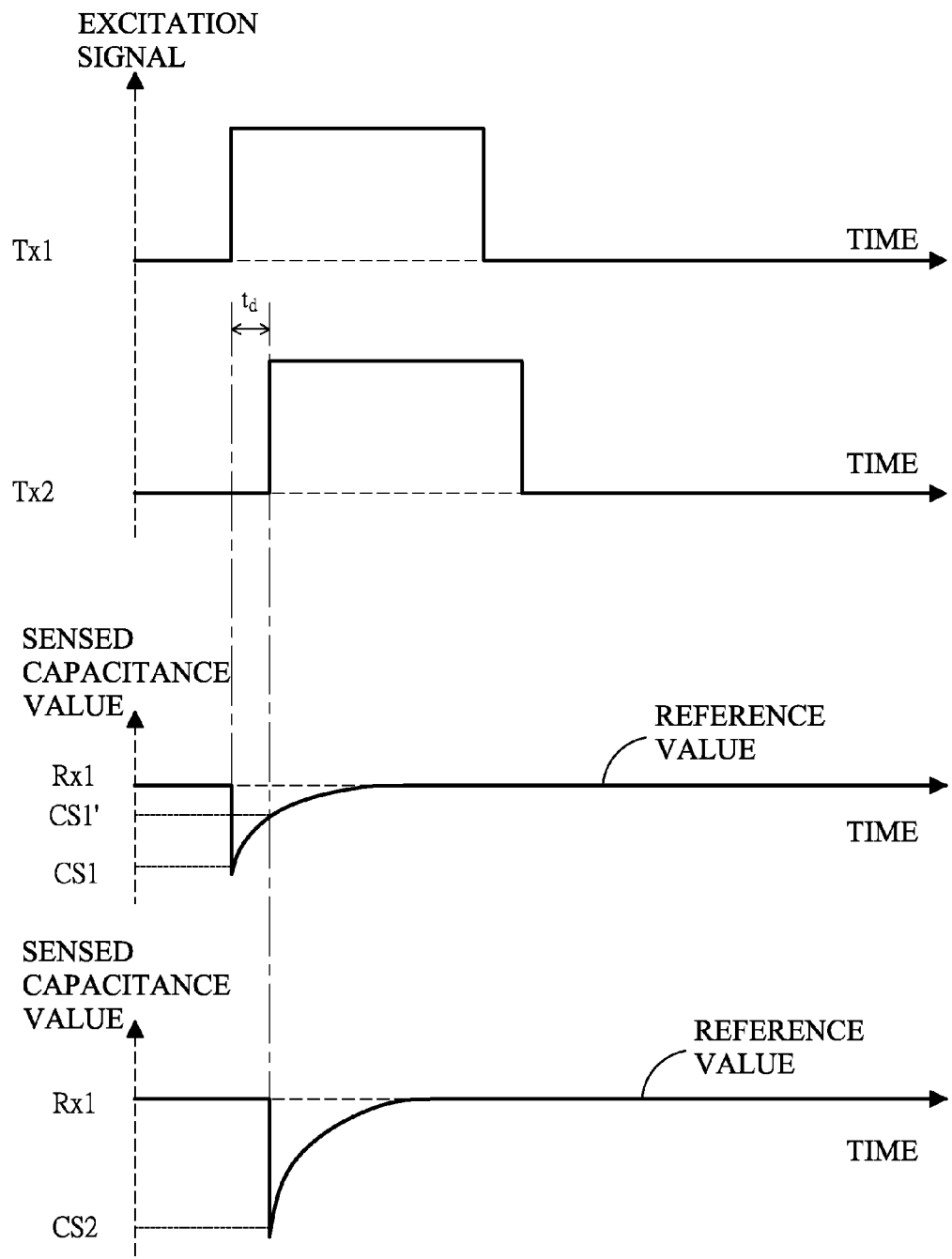
FIG. 5 is a waveform diagram of signals of two driving lines and a sensing line of the touch panel in FIG. 1.
Figure 6:
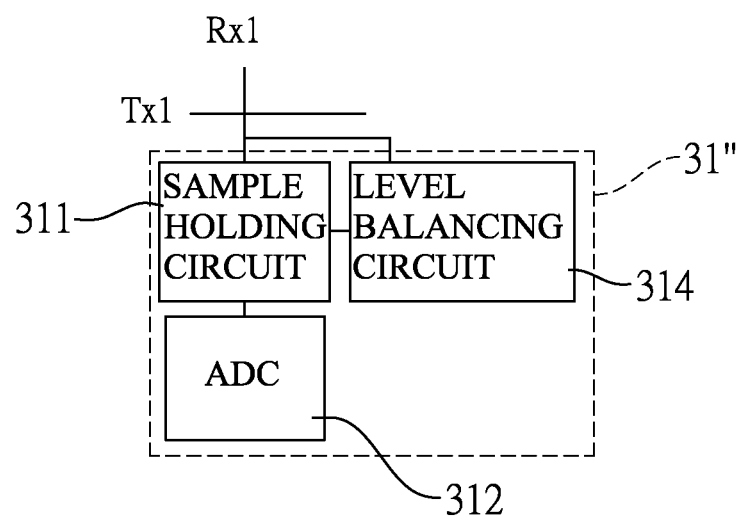
FIG. 6 is a functional block diagram of a third embodiment of a sensing unit of the touch panel in FIG. 1.
Figure 7:
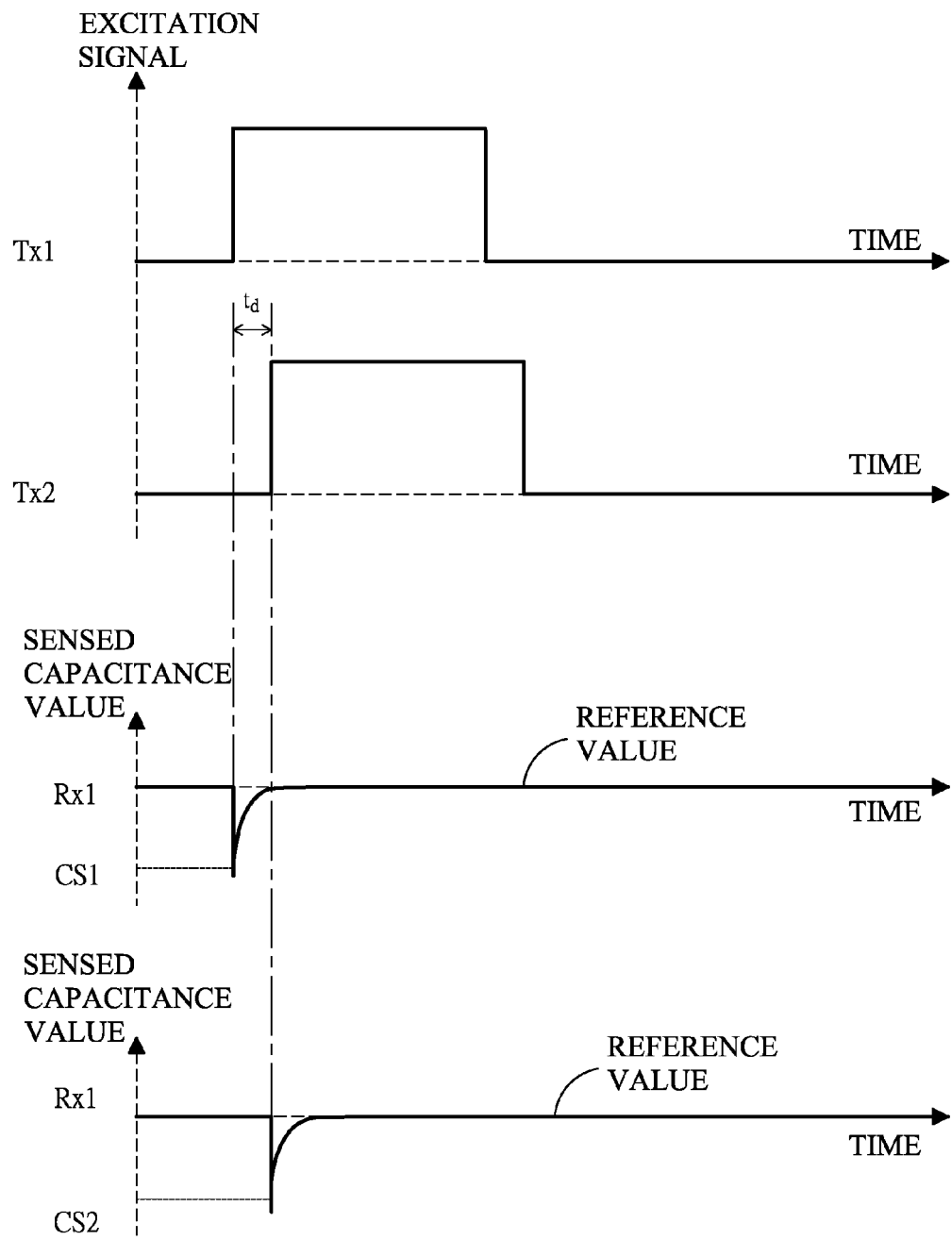
FIG. 7 is a waveform diagram of signals of two driving lines and a sensing line of the sensing unit in FIG. 6.
Figure 8A:
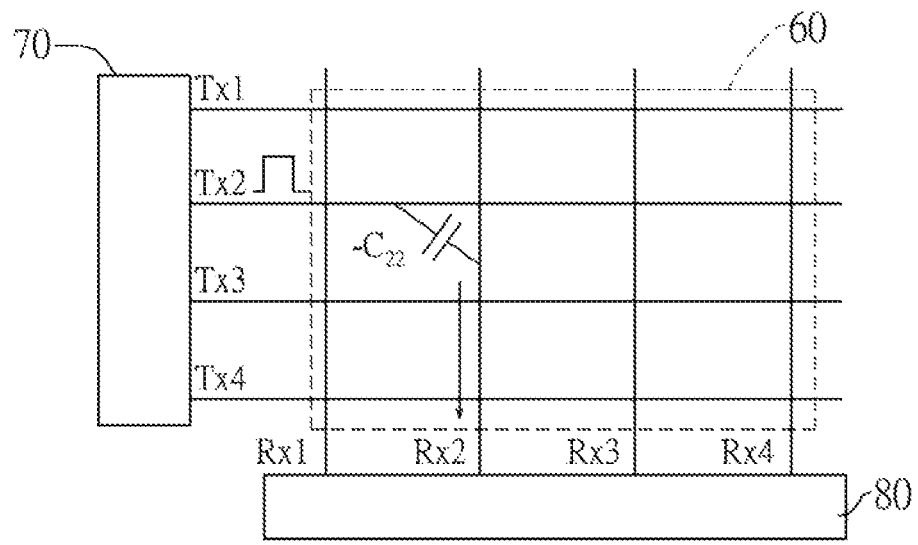
FIG. 8A is a wiring layout diagram of a conventional touch panel.
Figure 8B:
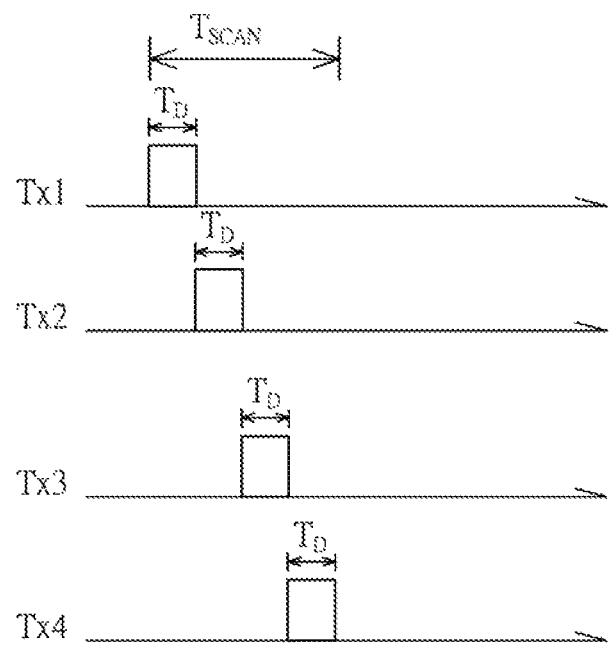
FIG. 8B is a scanning time sequence diagram of driving lines of the conventional touch panel in FIG. 8A.
Figure 8C:
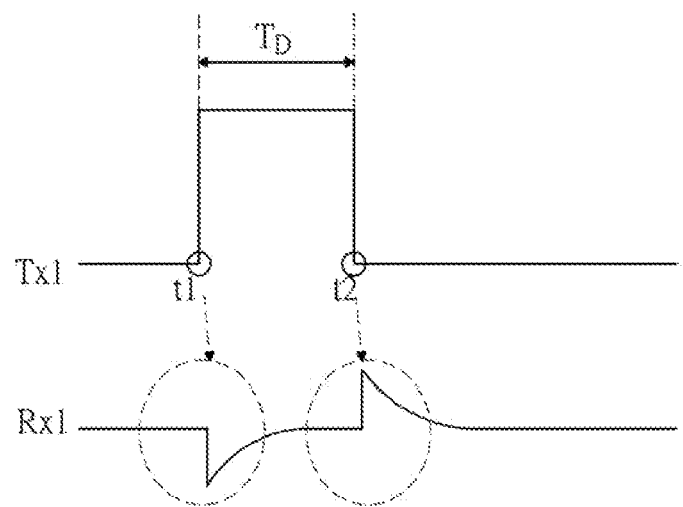
FIG. 8C is a waveform diagram of a driving line and a sensing line of the conventional touch panel in FIG. 8A.
Figure 9:
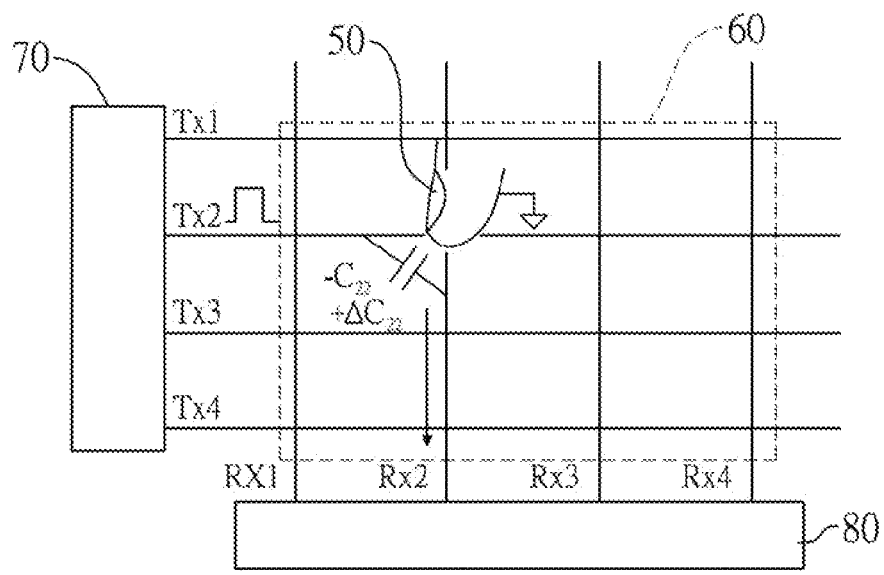
FIG. 9 is a schematic diagram of the conventional touch panel in FIG. 8A having a well-grounded touch object thereon.
Figure 10:
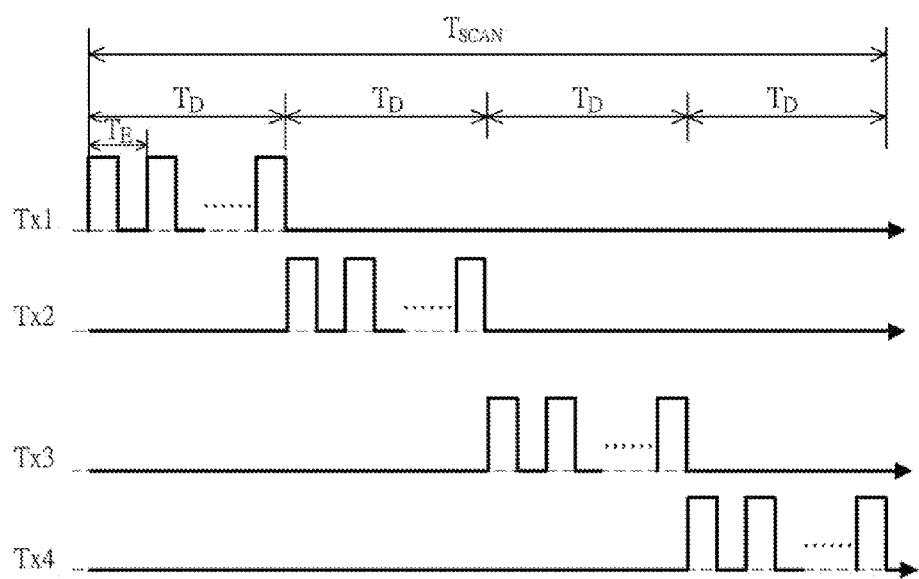
FIG. 10 is another scanning time sequence diagram of driving lines of the conventional touch panel in FIG. 8A.

With reference to FIG. 5, after the first set of excitation signals is outputted to the driving line Tx1, the capacitance sensing value of the sensing line Rx1 varies. As known from FIG. 5, for a regular capacitance sensing value CS1, a capacitance value CS1' after a sample holding time is elapsed is unable to recover to its reference value. If the second set of excitation signals is successively outputted to the driving line Tx2 at the moment, the capacitance sensing value CS2 of the sensing line RX1 is affected and becomes inaccurate. Hence, under the premise of not extending the time difference between the two sets of excitation signals, the touch panel device further has a level balancing circuit. With reference to FIG. 6, the sample holding circuit 311 of the sensing unit 31" is connected to the level balancing circuit 314, which may be a current source circuit or a voltage source circuit. After the sample holding circuit finishes sampling, the level balancing circuit rapidly recovers the capacitance sensing value of a corresponding sensing line to the reference value. With reference to FIG. 7, the capacitance sensing value can be recovered to the reference value within the sample holding time, thereby preventing the capacitance sensing values of the sensing lines from being inaccurate after next set of excitation signals is outputted.

In sum, the scan method of the present invention is characterized in that multiple sets of excitation signals are outputted within each detection cycle of a scan time. In contrast to conventional scan methods only outputting one set of excitation signals within each detection cycle, the time required to scan entire driving lines is greatly reduced. Additionally, the multiple sets of excitation signals are asynchronous and partially overlap in time so that the interference to the capacitance sensing values sensed by the sensing circuit in response to the multiple sets of excitation signals won't occur. Accordingly, the present invention can truly shorten the scan time and enhance the frame generation rate.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A scan method for increasing frame rate of a touch panel, the touch panel having multiple driving lines, multiple sensing lines and a scan cycle with multiple detection cycles, and the method comprising steps of:
   generating multiple sets of excitation signals having same frequency and being asynchronous within each detection cycle with each set of excitation signals outputted to a corresponding driving line, wherein each excitation signal has one pulse, and when a first and second sets of excitation signals within one detection cycle are respectively outputted to the two driving line, at least one pulse signal of the second set thereof partially overlaps one pulse signal of the first set thereof in time; and
   receiving capacitance sensing values from the sensing lines corresponding to the driving lines,
   wherein a time difference is maintained between the first set of pulse signal and the second set of pulse signal.

2. The method as claimed in claim 1, wherein the time difference is not less than a sample holding time and is not greater than the detection cycle.

3. The method as claimed in claim 2, wherein the multiple sets of excitation signals are sequentially outputted to every other adjacent multiple ones of the driving lines corresponding to the multiple sets of excitation signals in number.

4. The method as claimed in claim 2, wherein the multiple sets of excitation signals are sequentially outputted to every adjacent multiple ones of the driving lines spaced apart from one another and corresponding to the multiple sets of excitation signals in number.

5. The method as claimed in claim 4, wherein the adjacent multiple ones of the driving lines are spaced apart from one another by one of the driving lines.

6. The method as claimed in claim 4, wherein the adjacent multiple ones of the driving lines are spaced apart from one another by multiple ones of the driving lines.

7. The method as claimed in claim 1, wherein the multiple sets of excitation signals are sequentially outputted to every other adjacent multiple ones of the driving lines corresponding to the multiple sets of excitation signals in number.

8. The method as claimed in claim 1, wherein the multiple sets of excitation signals are sequentially outputted to every adjacent multiple ones of the driving lines spaced apart from one another and corresponding to the multiple sets of excitation signals in number.

9. The method as claimed in claim 8, wherein the adjacent multiple ones of the driving lines are spaced apart from one another by one of the driving lines.

10. The method as claimed in claim 8, wherein the adjacent multiple ones of the driving lines are spaced apart from one another by multiple ones of the driving lines.

11. A touch panel device comprising:
    a touch panel having multiple driving lines and multiple sensing lines;
    a driving circuit connected to the driving lines of the touch panel, having a scan cycle with multiple detection cycles, generating multiple sets of excitation signals having same frequency and being asynchronous within each detection cycle, and outputting each set of excitation signals to corresponding driving lines, wherein each excitation signal has one pulse, and when a first and second sets of excitation signals within one detection cycle are respectively outputted to the two driving line, at least one pulse signal of the second set thereof partially overlaps one pulse signal of the first set thereof in time; and
    a sensing circuit having multiple sensing units respectively connected to the sensing lines to sense a capacitance sensing value of each sensing line,
    wherein a time difference is maintained between the first set of pulse signal and the second set of pulse signal.

12. The device as claimed in claim 11, wherein the time difference is not less than a sample holding time and is not greater than the detection cycle.

13. The device as claimed in claim 12, wherein the multiple sets of-excitation signals are sequentially outputted to every other adjacent multiple ones of the driving lines corresponding to the multiple sets of excitation signals in number.

14. The device as claimed in claim 12, wherein the multiple sets of excitation signals are sequentially outputted to every adjacent multiple ones of the driving lines spaced apart from one another and corresponding to the multiple sets of excitation signals in number.

15. The device as claimed in claim 14, wherein the adjacent multiple ones of the driving lines are spaced apart from one another by one of the driving lines.

16. The device as claimed in claim 14, wherein the adjacent multiple ones of the driving lines are spaced apart from one another by multiple ones of the driving lines.

17. The device as claimed in claim 12, wherein the sensing unit has:
    a sample holding circuit connected to a corresponding sensing line to sense a coupling capacitance of the sensing line;
    an analog-to-digital converter (ADC) connected to the sample holding circuit to acquire a sampled capacitance sensing value; and
    a level balancing circuit connected to the sample holding circuit and recovering the capacitance sensing value of a corresponding sensing line to a reference value after the sample holding circuit finishes sampling.

18. The device as claimed in claim 17, wherein the sample holding circuit samples at a rising edge or a falling edge within an excitation cycle of each excitation signal.

19. The device as claimed in claim 18, wherein the ADC is a non-pipeline ADC.

20. The device as claimed in claim 17, wherein the sample holding circuit samples at a rising edge and a falling edge within an excitation cycle of each excitation signal.

21. The device as claimed in claim 20, wherein the ADC is a pipeline ADC.

22. The device as claimed in claim 12, wherein each sensing unit has:
- a multiplexer connected to a corresponding sensing line;
- two sample holding circuits commonly connected to the multiplexer and connected to the corresponding sensing line through the multiplexer to sense a coupling capacitance sensing value of the corresponding sensing line;
- two non-pipeline ADCs respectively connected to the sample holding circuits to acquire sampled capacitance sensing values from the respective sample holding circuits.

23. The device as claimed in claim 11, wherein the multiple sets of excitation signals are sequentially outputted to every other adjacent multiple ones of the driving lines corresponding to the multiple sets of excitation signals in number.

24. The device as claimed in claim 11, wherein the multiple sets of excitation signals are sequentially outputted to every adjacent multiple ones of the driving lines spaced apart from one another and corresponding to the multiple sets of excitation signals in number.

25. The device as claimed in claim 24, wherein the adjacent multiple ones of the driving lines are spaced apart from one another by one of the driving lines.

26. The device as claimed in claim 24, wherein the adjacent multiple ones of the driving lines are spaced apart from one another by multiple ones of the driving lines.

27. The device as claimed in claim 11, wherein the sensing unit has:
- a sample holding circuit connected to a corresponding sensing line to sense a coupling capacitance of the sensing line;
- an analog-to-digital converter (ADC) connected to the sample holding circuit to acquire a sampled capacitance sensing value; and
- a level balancing circuit connected to the sample holding circuit and recovering the capacitance sensing value of a corresponding sensing line to a reference value after the sample holding circuit finishes sampling.

28. The device as claimed in claim 27, wherein the sample holding circuit samples at a rising edge or a falling edge within an excitation cycle of each excitation signal.

29. The device as claimed in claim 28, wherein the ADC is a non-pipeline ADC.

30. The device as claimed in claim 27, wherein the sample holding circuit samples at a rising edge and a falling edge within an excitation cycle of each excitation signal.

31. The device as claimed in claim 30, wherein the ADC is a pipeline ADC.

32. The device as claimed in claim 11, wherein each sensing unit has:
- a multiplexer connected to a singular corresponding sensing line;
- two sample holding circuits commonly connected to the multiplexer and connected to the corresponding sensing line through the multiplexer to respectively sense two coupling capacitance sensing values of the corresponding sensing line sampled at rising edge and falling edge of the excitation signal;
- two non-pipeline ADCs respectively connected to the sample holding circuits to acquire sampled capacitance sensing values from the respective sample holding circuits.

* * * * *